Patented Sept. 28, 1937

2,094,463

UNITED STATES PATENT OFFICE 2,094,463

VAT DYESTUFFS OF THE PYRIDONOANTHRAQUINONE SERIES

Paul Nawiasky and Rudolf Robl, Ludwigshafen-on-the-Rhine, Germany, assignors to General Aniline Works, Inc., New York, N. Y., a corporation of Delaware No Drawing. Application April 17, 1936, Serial No. 75,012. In Germany April 18, 1935

1 Claim. (Cl. 260—40)

The present invention relates to vat dyestuffs of the pyridonoanthraquinone series.

We have found that new, valuable vat dyestuffs of the pyridonoanthraquinone series are obtained by reacting pyridonoanthraquinones corresponding to the general formula:

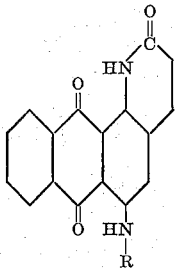

wherein R stands for the radical of a cyclic compound containing up to 4 condensed rings, with acid agents of the kind of anhydrous aluminium chloride or with alkaline agents, such as solutions of caustic alkalies, in the presence of aliphatic alcohols.

The said initial pyridonoanthraquinones can be obtained for example by causing anthraquinone-1(N).2-pyridones:

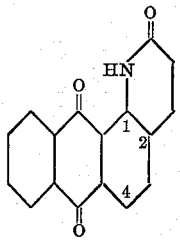

which contain in the 4-position exchangeable atoms or atomic groups to react with cyclic amino compounds or by causing anthraquinone-1(N).2-pyridones of the said constitution which contain in the 4-position an amino group having at least one free hydrogen atom to react with cyclic compounds containing exchangeable groups as for example halogen atoms.

The reaction whereby our new, valuable vat dyestuffs are obtained is generally speaking carried out at elevated temperature and preferably in the presence of a diluent, such as pyridine.

The new dyestuffs generally speaking have excellent fastness properties, and in particular they are extremely fast to light and chlorine.

The following examples will further illustrate how the said invention may be carried out in practice, but the invention is not restricted to these examples. The parts are by weight.

Example 1

1 part of the pyridonoanthraquinone obtainable by heating 4-chloranthraquinone-1(N).2-pyridone with 1-aminoanthraquinone in the presence of nitrobenzene, sodium acetate and copper acetate is heated for about two hours with 1 part of anhydrous aluminium chloride and 4 parts of pyridine. The vat dyestuff obtained dyes cotton olive-grey shades from a red-brown vat.

Example 2

1 part of the pyridonoanthraquinone obtainable by heating 4-bromanthraquinone-1(N).2-pyridone with 1-amino-4-benzoylaminoanthraquinone in the presence of nitrobenzene and copper acetate is heated at 120° C. for an hour while stirring with 1 part of anhydrous aluminium chloride and 4 parts of pyridine. The melt is then boiled with concentrated hydrochloric acid, the dyestuff filtered off by suction and if desired further purified by treatment with hypochlorite solution. It yields olive dyeings of very good fastness properties on cotton from a red-brown vat.

If the pyridonoanthraquinone obtainable from 1-amino-5-benzoylaminoanthraquinone and 4-bromanthraquinone-1(N).2-pyridone be employed instead of the initial material mentioned in the preceding paragraph, a vat dyestuff is obtained which dyes cotton brown shades from a brown vat.

In a similar manner the corresponding pyridonoanthraquinones obtainable by reacting 4-halogenanthraquinone-1(N).2-pyridone with 1-amino-4- or 5-anisoylaminoanthraquinones or 1-amino-4- or 5-para-chlorbenzoylaminoanthraquinones may be employed as starting materials.

Example 3

1 part of the pyridonoanthraquinone obtainable by reacting 4-bromanthraquinone-1(N).2-pyridone with 1.4-diaminoanthraquinone in the presence of potassium acetate, copper acetate and nitrobenzene is heated with anhydrous aluminium chloride in the presence of pyridine while stirring for about three quarters of an hour at 120° C. In order to purify the dyestuff it may be precipitated from concentrated sulfuric acid and treated with hypochlorite solution. It dissolves in concentrated sulfuric acid giving a yellow-green coloration and yields neutral grey shades on cotton from a brown vat.

*Example 4*

0.5 part of the pyridonoanthraquinone obtainable by reacting 4-bromanthraquinone-1(N).2-(Py.4-phenyl)-pyridone and 1-amino-5-benzoylaminoanthraquinone in the presence of sodium acetate and copper acetate is heated with 2.5 parts of anhydrous aluminium chloride and 1.2 parts of sodium chloride for a short time at about 220° C. After working up the melt in the usual manner a vat dyestuff is obtained which dyes cotton brown-violet shades.

A vat dyestuff which yields quite similar dyeings is obtained by employing as initial material the pyridonoanthraquinone obtainable by condensing 4 - bromanthraquinone - 1(N).2 - (Py.4 - methyl)-pyridone with 1-amino-5-benzoylaminoanthraquinone.

*Example 5*

1 part of the pyridonoanthraquinone obtainable by heating 4-aminoanthraquinone-1(N).2-pyridone with Bz1-brombenzanthrone in the presence of sodium acetate, copper acetate and nitrobenzene is heated for about 20 minutes at from 125° to 130° C. with 10 parts of caustic potash and 10 parts of ethanol. After working up in the usual manner, a vat dyestuff is obtained which dyes cotton brown shades from a blue-grey vat.

*Example 6*

1 part of the pyridonoanthraquinone obtainable by heating 4-bromanthraquinone-1(N).2-pyridone with 2-aminonaphthalene in the aforementioned manner is heated with 1 part of anhydrous aluminium chloride and 4 parts of pyridine for half an hour at about 120° C. The dyestuff isolated in the usual manner dyes cotton violet shades from a brownish red vat.

Similar dyestuffs are obtained by employing the initial material used in Example 1 or by employing the pyridonoanthraquinone obtainable by condensing a 4-halogenanthraquinone-1(N).2-pyridone with an aminopyridine or an aminoquinoline.

What we claim is:

The vat dyestuff of the pyridonoanthraquinone series corresponding to the formula

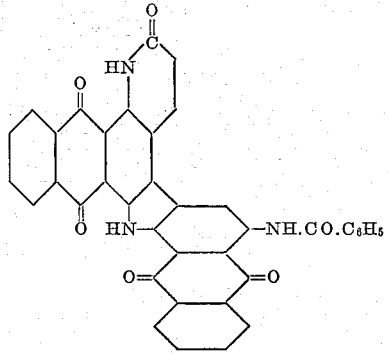

PAUL NAWIASKY.
RUDOLF ROBL.